(12) United States Patent
Kuzmic et al.

(10) Patent No.: US 12,515,309 B2
(45) Date of Patent: Jan. 6, 2026

(54) PLIERS RACK

(71) Applicant: A & E Incorporated, Racine, WI (US)

(72) Inventors: Jeffrey J Kuzmic, Wind Lake, WI (US); Jason Horner, Burlington, WI (US); Billy Greuel, Waterford, WI (US); Richard Lee Hopper, Jr., Kenosha, WI (US)

(73) Assignee: A & E Incorporated, Racine, WI (US)

( * ) Notice: Subject to any disclaimer, the term of this patent is extended or adjusted under 35 U.S.C. 154(b) by 0 days.

(21) Appl. No.: 18/364,174

(22) Filed: Aug. 2, 2023

(65) Prior Publication Data

US 2025/0042013 A1 Feb. 6, 2025

(51) Int. Cl.
*B25H 3/04* (2006.01)

(52) U.S. Cl.
CPC ........................................ *B25H 3/04* (2013.01)

(58) Field of Classification Search
CPC .. B25H 3/04; A47L 19/04; A47J 47/16; A47F 5/112; A47B 81/068; G11B 23/0236; G11B 33/0405; G11B 33/0461
See application file for complete search history.

(56) References Cited

U.S. PATENT DOCUMENTS

| | | | |
|---|---|---|---|
| 2,197,789 A | 4/1940 | Dalton | |
| 2,207,286 A * | 7/1940 | Cohen | A47J 43/25 269/157 |
| 2,238,451 A | 4/1941 | Roth | |
| D127,973 S * | 7/1941 | Replogle | D6/407 |
| D132,201 S * | 4/1942 | Slough | D6/407 |
| 2,516,088 A * | 7/1950 | Einhorn | A47L 19/04 D32/55 |
| D160,015 S * | 9/1950 | Rauch et al. | D6/407 |
| 2,664,005 A * | 12/1953 | Kosinski | A47J 47/16 248/37.3 |
| 2,813,633 A * | 11/1957 | Welling | G11B 23/03 211/41.12 |
| 3,013,668 A * | 12/1961 | Mennen | A47F 5/112 211/195 |
| D217,633 S * | 5/1970 | Iorio | D32/55 |
| 3,512,287 A * | 5/1970 | Mark | A47F 7/02 40/124 |
| D231,178 S * | 4/1974 | Shrewsbury | D6/678.4 |
| 4,128,175 A * | 12/1978 | Schweizer | G11B 33/0483 D6/407 |
| 4,505,393 A * | 3/1985 | Fleigle | A61L 2/26 403/252 |
| 4,684,027 A | 8/1987 | Wright | |
| 4,995,682 A * | 2/1991 | Gutner | G11B 23/0236 211/41.12 |
| D318,196 S | 7/1991 | Sheng | |

(Continued)

OTHER PUBLICATIONS

Forward/Reverse Gripper Wrench Pack; Ernst Manufacturing Inc.; web page accessed 2023.

(Continued)

*Primary Examiner* — Patrick D Hawn

(57) ABSTRACT

A tool rack is disclosed. A pair of flanges rest on a carrying surface such as a rack of a toolbox, or a tool cart. A series of risers extend away from the flanges and across a width between the flanges to create individual riser nests within which to store tools.

9 Claims, 5 Drawing Sheets

(56) References Cited

U.S. PATENT DOCUMENTS

| | | | | |
|---|---|---|---|---|
| 5,111,940 A | * | 5/1992 | VanNoord | G11B 23/0236 |
| | | | | 211/40 |
| D331,166 S | * | 11/1992 | Ohadi | D6/407 |
| D351,528 S | * | 10/1994 | Dardashti | D6/682.4 |
| 5,358,124 A | * | 10/1994 | Mueller | G11B 23/0236 |
| | | | | 211/41.12 |
| 5,370,242 A | * | 12/1994 | Huang | A47B 81/068 |
| | | | | 211/59.4 |
| D361,019 S | * | 8/1995 | Voglis | D7/633 |
| D361,917 S | * | 9/1995 | Dardashti | D6/407 |
| D367,382 S | | 2/1996 | Tseng | |
| D374,582 S | * | 10/1996 | Chu | D6/407 |
| D381,548 S | * | 7/1997 | Goodman | D6/678.4 |
| D384,235 S | * | 9/1997 | Dardashti | D6/674 |
| D387,942 S | * | 12/1997 | Dardashti | D6/678.4 |
| D392,498 S | * | 3/1998 | Steinbeck | D6/682.2 |
| D394,980 S | * | 6/1998 | Goodman | D6/678.4 |
| D404,959 S | * | 2/1999 | Cheris | D6/682.2 |
| D405,310 S | * | 2/1999 | Cheris | D6/682.4 |
| D414,068 S | * | 9/1999 | Fells | D6/682.2 |
| 6,082,553 A | * | 7/2000 | Stravitz | A47B 63/00 |
| | | | | 312/9.9 |
| D429,439 S | * | 8/2000 | Mok | D6/630 |
| D434,248 S | | 11/2000 | Krogh | |
| D434,937 S | * | 12/2000 | Cheris | D6/630 |
| D436,490 S | * | 1/2001 | Kwok | D6/682.2 |
| 6,170,675 B1 | * | 1/2001 | Follman | A47B 81/068 |
| | | | | 211/189 |
| D442,392 S | * | 5/2001 | Follman | D19/86 |
| 6,279,757 B1 | * | 8/2001 | Hayoun | G11B 33/0405 |
| 6,427,851 B1 | | 8/2002 | Chang | |
| D483,598 S | * | 12/2003 | Smith | D6/407 |
| 6,988,627 B2 | * | 1/2006 | Hunt | G11B 33/0461 |
| | | | | 211/41.12 |
| D538,106 S | * | 3/2007 | Julian | D7/409 |
| D555,203 S | * | 11/2007 | Goodman | D19/90 |
| D582,697 S | | 12/2008 | Goodman et al. | |
| D639,613 S | * | 6/2011 | Goodman | D6/678.4 |
| D658,939 S | * | 5/2012 | Adams | D7/402 |
| D669,312 S | * | 10/2012 | Thorpe | A47J 47/16 |
| | | | | D7/601 |
| D670,339 S | * | 11/2012 | Mitchell | D19/90 |
| D673,391 S | | 1/2013 | Whitehead | |
| D705,018 S | * | 5/2014 | Liotta | D7/637 |
| D717,371 S | * | 11/2014 | Tsai | D19/90 |
| D723,875 S | * | 3/2015 | Elattrache | D7/637 |
| D729,021 S | * | 5/2015 | Goodman | D7/704 |
| D742,145 S | * | 11/2015 | Hsu | D6/683.1 |
| 9,383,179 B1 | | 7/2016 | Spilotro | |
| D774,356 S | * | 12/2016 | Maiorana | D7/409 |
| D788,547 S | * | 6/2017 | Hepburn | D7/637 |
| 9,677,704 B1 | * | 6/2017 | Thelen | F16M 11/22 |
| 9,949,595 B1 | * | 4/2018 | Greenwood | A47J 47/16 |
| D816,378 S | | 5/2018 | Ernst | |
| D823,078 S | * | 7/2018 | Tuang | D7/704 |
| D846,319 S | * | 4/2019 | Min | D6/675.2 |
| 10,500,712 B2 | | 12/2019 | Ernst | |
| D883,722 S | | 5/2020 | Dittrich | |
| D891,832 S | * | 8/2020 | Min | D6/675.2 |
| D898,116 S | | 10/2020 | Snell | |
| D901,950 S | | 11/2020 | McBrien | |
| D904,832 S | * | 12/2020 | Medeiros Santos | D7/637 |
| D910,349 S | * | 2/2021 | Kurlander | D6/678.4 |
| D920,724 S | * | 6/2021 | Burger | D6/678.4 |
| D921,404 S | * | 6/2021 | Kurlander | D6/678.4 |
| D922,484 S | | 6/2021 | Tsai | |
| D935,524 S | | 11/2021 | Liu | |
| D956,451 S | * | 7/2022 | Megill | D6/629 |
| D974,090 S | * | 1/2023 | Kurlander | D6/678.4 |
| D986,692 S | * | 5/2023 | Elattrache | D7/637 |
| D1,011,809 S | * | 1/2024 | Chen | D6/678.4 |
| 2003/0019825 A1 | * | 1/2003 | de Rouvray | G11B 33/0444 |
| 2010/0206997 A1 | * | 8/2010 | Starke | A47G 21/14 |
| | | | | 248/37.3 |

OTHER PUBLICATIONS

30 Tool No. Slip Low Profile Wrench Rail Set; Ernst Manufacturing Inc.; web page accessed 2023.
10 Tool Plier Pro; Ernst Manufacturing Inc.; web page accessed 2023.
5 Tool Gripper Stubby Wrench Organizer; Ernst Manufacturing Inc.; web page accessed 2023.
40 Tool Space Saver Wrench Rail Organizers; Ernst Manufacturing Inc.; web page accessed 2023.
Pliers/Wrench Rack; www.mactools.com/products/140490; captured Jul. 19, 2023.
Plyworx PliersRack PLR30; Summit Racing Equipment; web page accessed 2023.
Plyworx PLR14—PliersRackII 14-Slot; TOOLSID.com; web page accessed 2023.
International Search Report and Written Opinion dated Jul. 29, 2024 from PCT/US2024/034607, 6 pgs.

* cited by examiner

PLIERS RACK

BACKGROUND OF THE INVENTION

The present invention relates to a storage rack to carry objects such as hand held tools, although the rack of the present invention can carry a variety of objects.

Storage racks are used to store a wide variety of objects either vertically or horizontally. A storage rack is formed with slots or compartments specially designed to hold and display objects such as tools. These slots can vary in size, accommodating various sized articles.

Prior art storage racks for storing objects are known. One common example of a storage rack for tools such as pliers is a formed wire rack, which shares structural similarity to racks commonly found in a dishwasher. Another common example of a rack is a base which carries a series of vertical walls, between which are defined bays for storing objects.

The slots or walls of the racks are spaced apart to prevent overcrowding and allow easy access to the articles. This prevents cluttering of a toolbox.

SUMMARY OF THE INVENTION

The present invention provides a pliers rack crafted preferably from heavy-duty material such as steel, which is intended to hold tools such as pliers, preferably horizontally, in a toolbox or a rack, the tools held between in individual riser nests.

The rack is formed from an initially flat sheet of metal cut to size (e.g., 30"×6"). Void spaces are then created in the flat sheet (e.g., by punching/stamping/lasering). A variety of different sized and shaped void spaces can be provided, for instance variable width and length or various profiles, in order to accommodate different shaped and sized tools.

The still flat sheet—with voids cut out—is then presented to a secondary former such as a bending die, where bends are created to provide a third dimension (height) to the rack. Material left from the punching/stamping/lasering step that is left between adjacent void spaces creates risers once the height dimension is formed, and spaces between adjacent risers create riser nests to cradle tools.

The rack may then be coated, for instance dipped in a rubberized material to provide grip and to soften the edges of the flanges and risers. In a preferred embodiment, the rack is dipped in a heated suspension of PVC or other polymer particles in a liquid plasticizer. The coated rack is then allowed to cool and cure so that the coating remains flexible and permanently adhered to the metal portion of the formed rack. This coating retains a smooth rubbery consistency, which provides good grip to surfaces that the rack is carried by.

Tools ranging from small screwdrivers to pliers to larger hammers and power tools can be stored, ensuring that every item has a designated place for easy retrieval.

The rack provides tool accessibility, allowing a user to view all stored tools at a glance, making it easy to locate the desired tool without rummaging through cluttered toolbox drawers.

The wide base and depth of the rack, horizontal flange orientation, and rubberized frictional surface provide secure anchoring to help prevent accidental tipping, ensuring that the rack remains stable, even when heavily loaded with tools. With a dedicated spot for each tool, the rack prevents tools from coming into contact with each other, reducing the risk of scratches, dents, or other damages.

The horizontal design of the rack optimizes the use of space within a toolbox, and eliminates the clutter that often plagues toolboxes, providing a clean and organized environment that fosters productivity and creativity.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
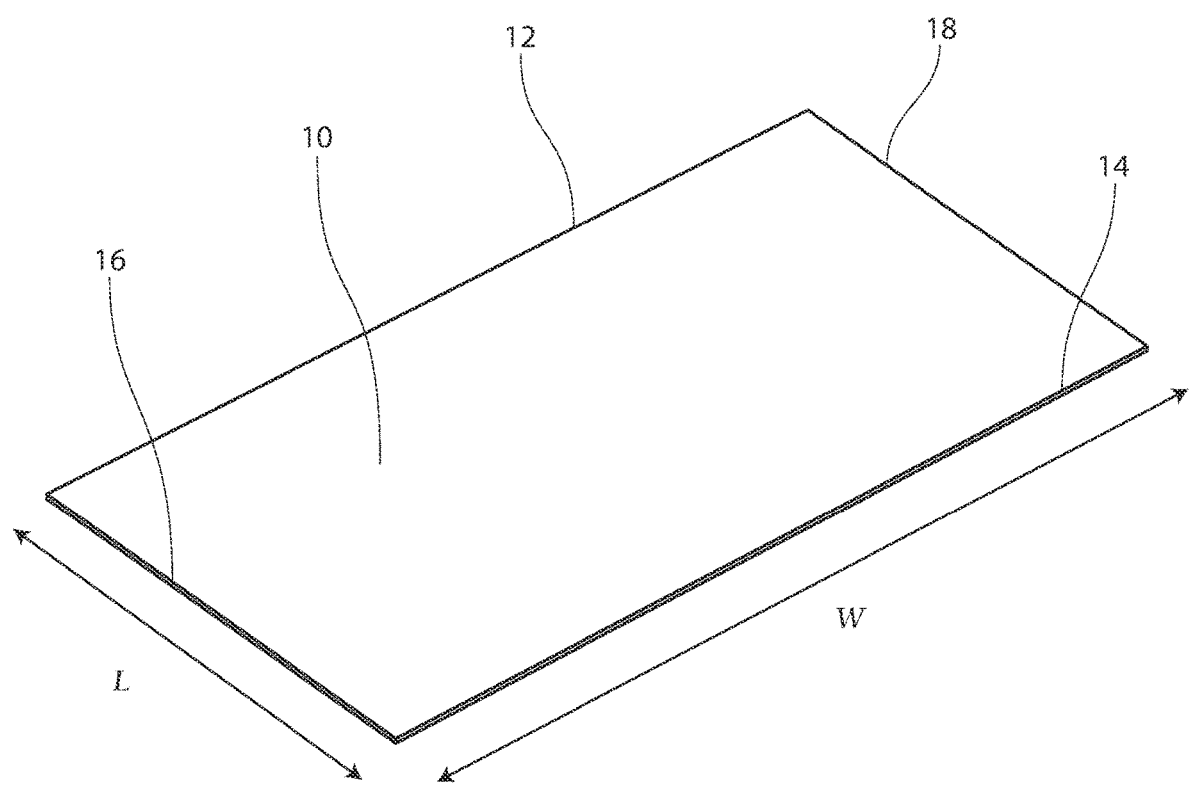
FIG. 1 is a perspective view of a base material from which to fabricate a tool rack.

Referring now to FIG. 1, a perspective view of a base material 10 from which to fabricate a tool rack is shown. In a preferred embodiment, the base material 10 is a sheet metal such as steel, preferably of a thickness amenable to bending, with a width W and a length L, a top edge 12, a bottom edge 14, a left side edge 16, and a right side edge 18. The base material 10 is preferably cut to size (e.g., 30"×6") depending on the intended final dimensions of the tool rack being created.

Figure 2:
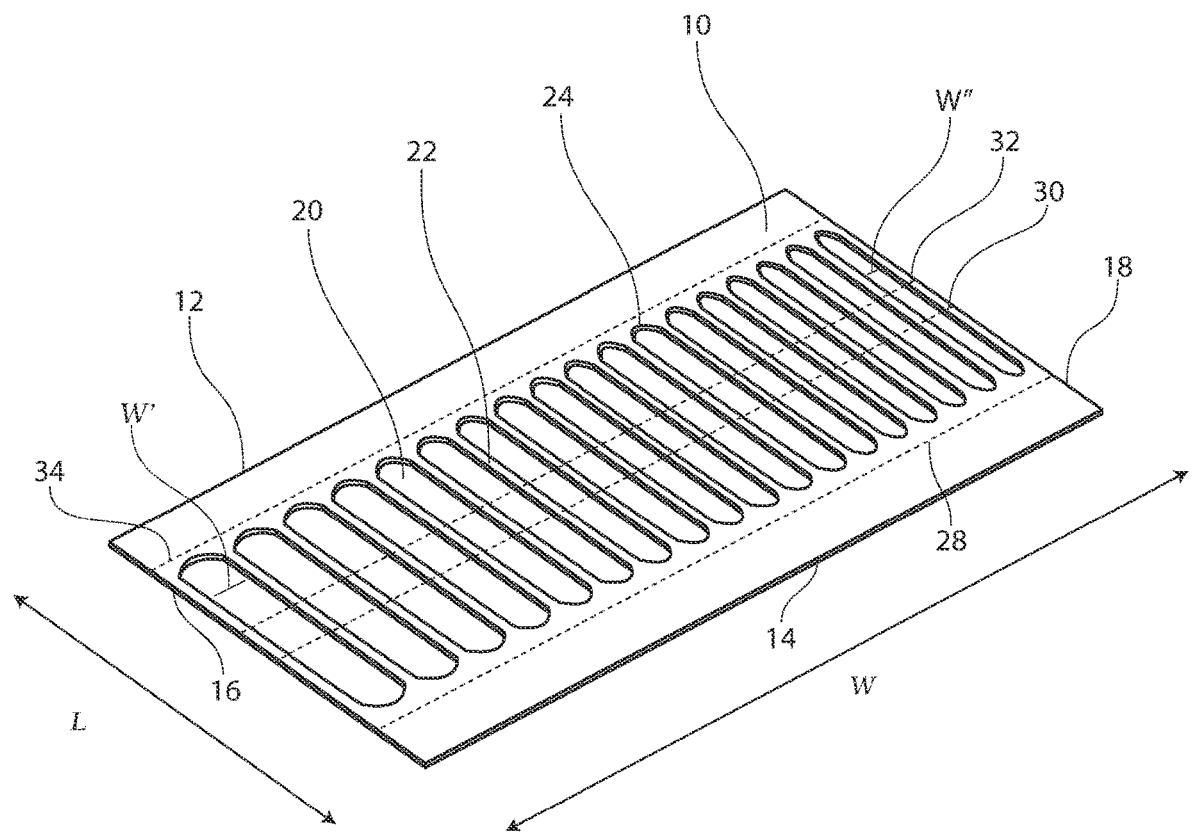
FIG. 2 is a perspective view of the base material with void spaces created therein.

Referring now to FIG. 2, a perspective view of the base material 10 is shown with void spaces 20 created therein. Void spaces 20 are created in the base material (flat sheet) 10, for instance by punching, stamping, or laser cutting. Material between void spaces 20 forms risers 22. A variety of different shaped void spaces 20 can be provided, for instance variable width and length or various profiles, in order to accommodate different shaped and sized tools. Different widths between adjacent risers 22 can also be provided in order to accommodate different sized tools. In one preferred embodiment, risers at one end of the width W of base material 10 (for instance adjacent to left side edge 16) are spaced apart at a larger width W', and risers 22 at the other end of the base material 10 (for instance adjacent to right side edge 18) are spaced apart at a width W" less than W'. In a preferred embodiment, risers 22 could be spaced apart in increasing widths between W' and W" to provide an array of widths.

In a preferred embodiment, void spaces 20 are formed with rounded tops and bottoms to form rounded riser bases 24, towards both the top and the bottom edges 12 and 14. The rounded riser base 24 configuration is preferred in order to cradle tools.

Figure 3:
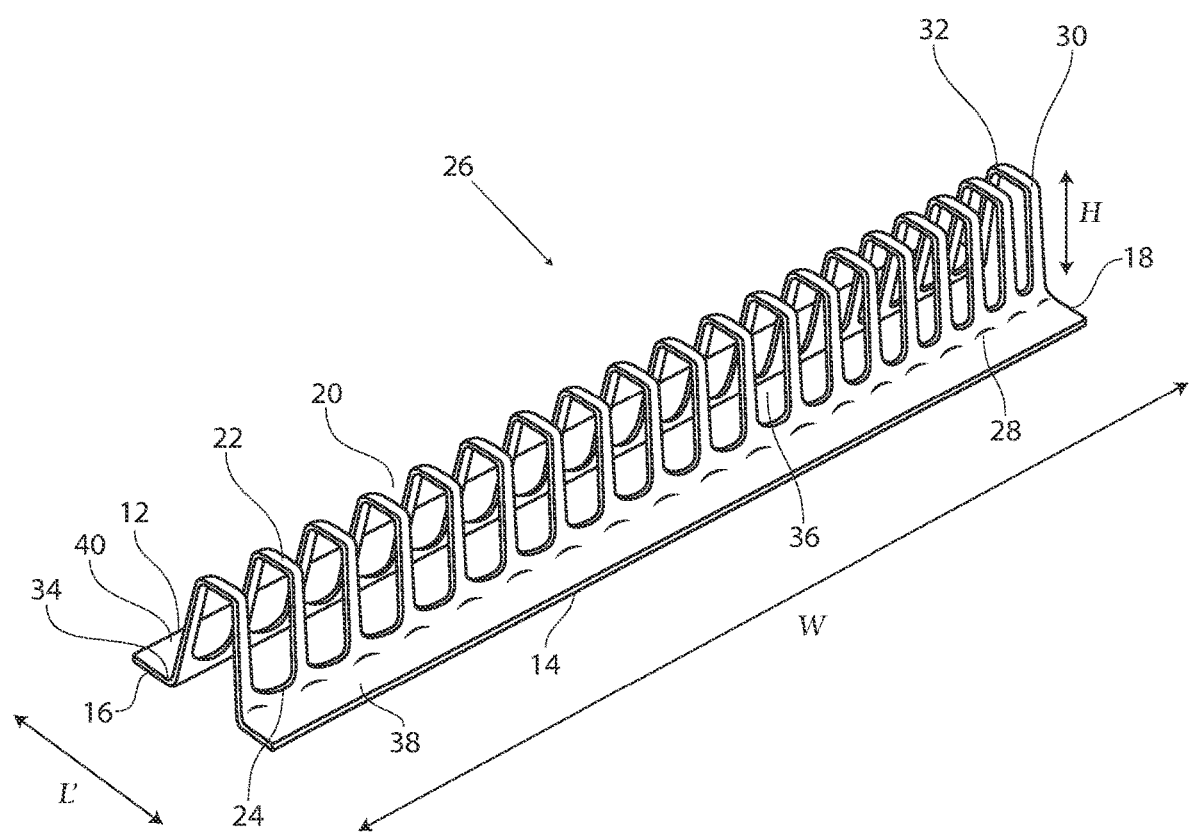
FIG. 3 is perspective view of the base material with void spaces, after undergoing a material bending process to create a tool rack.

Predetermined bending lines 28, 30, 32, and 34 are lines upon which the base material 10 will be bent, as described in reference to FIG. 3. In a preferred pattern of predetermined bending lines, bending line 28 will be formed between bottom edge 14 and bottom riser bases 24, and bending line 34 will be formed between top edge 12 and top riser bases 24. Bending lines 30 and 32 are preferably formed spaced across risers 22.

Referring now to FIG. 3, a perspective view is shown of the base material 10 with void spaces 20 formed therein, after undergoing a material bending process (not shown) to create a tool rack 26.

In a preferred construction technique, a bending die, also known as a press brake die or simply a die, is used in conjunction with a press brake machine to bend or shape the base material 10. The bending die applies a precise force to deform the base material 10 along predetermined bending lines 28, 30, 32, and 34 as shown in FIG. 2 (the lines not shown in FIG. 3, reference numerals 28, 30, 32, and 34 in FIG. 3 just pointing to a point along the lines for clarity), achieving the desired shape of tool rack 26.

Before the bending process, an operator sets up the press brake machine by installing an appropriate bending die into a die holder (not shown). The base material 10 is then accurately positioned between a punch and a die block (not shown), ensuring that, sequentially, the bend lines 28, 30, 32, and 34 align with the bending point on the punch. When the press brake is activated, the ram, along with the attached punch, descends towards the die block (not shown). As the punch presses against the base material 10, it exerts significant force, sequentially, along the bend lines 28, 30, 32, and 34 as shown in FIG. 2. This force causes the base material 10 to yield and deform, resulting in the desired bend angles and shape. For complex shapes or long workpieces, multi-stage bending can be used. This process involves bending the base material 10 in multiple steps, repositioning the base material 10 and adjusting the bending die as needed to achieve the final desired shape.

Bending along the bend lines 28, 30, 32, and 34 provides tool rack 26 with a height dimension H. In a preferred embodiment, riser nests 36, which are void spaces 20 provided with a height dimension H, are created wide enough to accommodate the desired tool, yet narrow enough so the desired tool does not list or lean. Due to the bending process, initial length L of base material 10 results in a shorter final length of the tool rack L'.

Between bottom edge 14 and first bend line 28, a first flange 38 is created. Between fourth bend line 34 and top edge 12, second flange 40 is created. Although the first flange 38 is depicted parallel and coplanar with the second flange 40, in an alternate embodiment the first flange 38 could be nonparallel with the second flange 40, or the first flange 38 and second flange 40 could be at different elevations in height dimension H (not shown).

Figure 4:
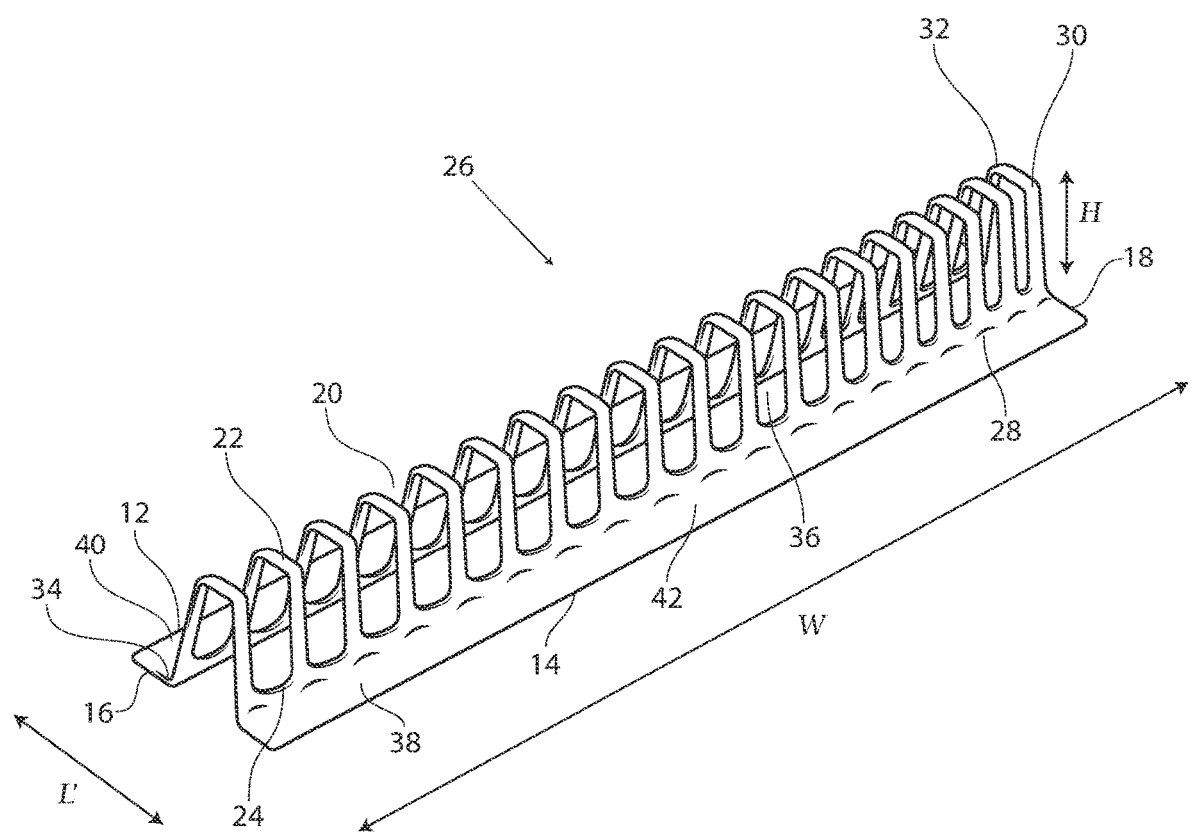
FIG. 4 is perspective view thereof, the tool rack having undergone a dipping/coating process.

Referring now to FIG. 4, the tool rack 26 is preferably exposed to a dipping/coating process to coat tool rack 26 in rubberized material 42. In a preferred process, the tool rack 26 is dipped in rubberized material 42 to provide grip and to soften the edges of the flanges and risers of the tool rack. The rack is dipped in a heated suspension of PVC or other polymer particles in a liquid plasticizer. The coated tool rack 26 is then allowed to cool and cure so that the coating 42 remains flexible and permanently adhered to the metal portion of the formed tool rack 26.

Figure 5:
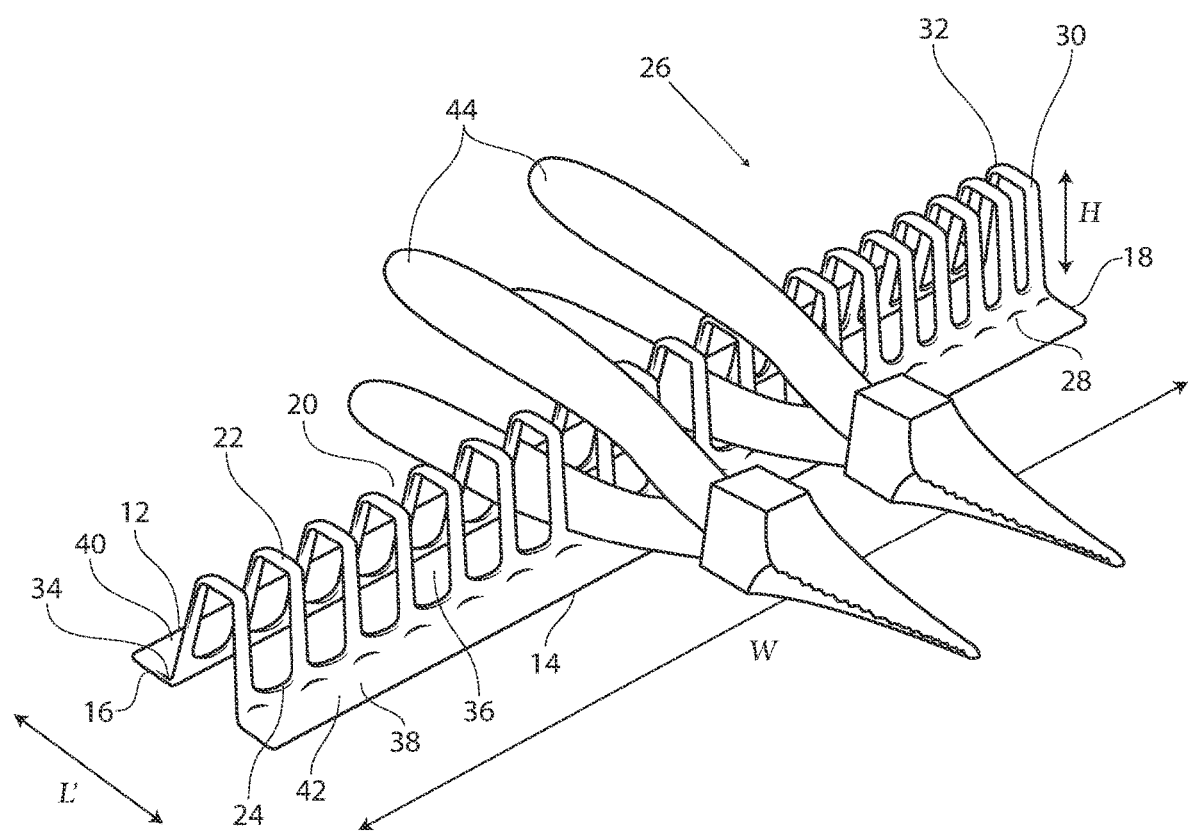
FIG. 5 is perspective view thereof, the tool rack carrying tools.

Referring now to FIG. 5, a perspective view is shown of the tool rock carrying tools 44.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

The invention claimed is:

1. A tool rack comprising:
   a material comprising a top edge, a bottom edge, and a first and a second side edge;
   a plurality of void spaces formed in said material, said void spaces comprising a first end adjacent said top edge, and a second end adjacent said bottom edge, said void spaces comprising an aperture through said material;
   a plurality of risers defined by said material between adjacent void spaces;
   a first bend in said material adjacent said top edge;
   a second bend in said material adjacent said bottom edge;
   a first flange comprising said material between said top edge and said first bend, said first flange extending in a width dimension and a length dimension;
   a second flange comprising said material between said bottom edge and said second bend, said second flange extending in said width dimension and said length dimension;
   a third bend in said risers between said first bend and said second bend;
   a fourth bend in said risers between said first flange and said second flange;
   a plurality of risers spaced apart in said width dimension and extending substantially perpendicularly to said first flange, said plurality of risers extending in said length dimension from said first flange to said second flange, said plurality of risers extending from said first flange in a height dimension at an oblique angle from a first elevation at said first flange, to a second elevation different than said first elevation, said plurality of risers depending at an oblique angle from said second elevation to third elevation at said second flange;
   said first bend in said material at an obtuse angle between said top edge and said first bend;
   said second bend in said material at an obtuse angle between said bottom edge and said second bend;
   a plurality of riser nests defined by a volume between adjacent risers;
   said riser nests comprising a rounded riser base between adjacent risers.

2. A tool rack according to claim 1, wherein said first flange is substantially coplanar with said second flange.

3. A tool rack according to claim 1, wherein said plurality of risers are spaced apart equally in said width dimension.

4. A tool rack according to claim 1, wherein said rack is coated with a rubberized material.

5. A tool rack according to claim 1, wherein said void spaces are formed by at least one of punching, stamping, or laser cutting.

6. A tool rack according to claim 1, wherein said first bend is formed by a bending die.

7. A tool rack according to claim 1, wherein said first flange is parallel with said second flange.

8. A tool rack according to claim 1, wherein said material comprises an initially flat sheet of material, said first, second and third bends in said initially flat sheet of material to provide said tool rack with a height dimension.

9. A tool rack according to claim 1, wherein said plurality of risers are spaced apart variably, increasing in width from a first width at said first side edge; to a second width between said first side edge and second side edge, said second width greater than said first width; to a third width at said second side edge, said third width greater than said second width.

* * * * *